United States Patent [19]
Okada et al.

[11] Patent Number: 5,488,481
[45] Date of Patent: Jan. 30, 1996

[54] APPARATUS FOR GENERATING A COMPOSITE VIDEO SIGNAL

[75] Inventors: Hiroshi Okada, Kanagawa; Hisato Shima, Chiba, both of Japan

[73] Assignee: Sony Corporation, Tokyo, Japan

[21] Appl. No.: 165,419

[22] Filed: Dec. 13, 1993

[30] Foreign Application Priority Data

Dec. 14, 1992 [JP] Japan .................................. 4-333141

[51] Int. Cl.⁶ .................................................. H04N 9/80
[52] U.S. Cl. ........................ 358/319; 348/501; 360/37.1
[58] Field of Search .................................. 358/319, 149, 358/150, 17, 19; 348/505, 506, 705, 706, 604, 501; 360/33.1, 37.1; H04N 9/44, 9/45, 9/455, 9/80, 9/87, 9/64

[56] References Cited

U.S. PATENT DOCUMENTS

| | | | |
|---|---|---|---|
| 4,618,880 | 10/1986 | Pires ......................................... | 348/505 |
| 4,985,757 | 1/1991 | Yasuki et al. . | |
| 5,025,310 | 6/1991 | Sekiya et al. ............................ | 348/506 |
| 5,062,004 | 10/1991 | Winterer . | |
| 5,194,964 | 3/1993 | Kawai ...................................... | 358/319 |
| 5,311,296 | 5/1994 | Ikefuji et al. ............................ | 348/505 |

OTHER PUBLICATIONS

Symposium Record Broadcast Sessions, vol. 2, 12 Jun. 1985, Montreux (CH) pp. 279–300 E. Fraser Morrisson 'Interface of a digital videotape recorder in a digital component studio' p. 289–p. 290, par. 1; FIGS. 9–11.

Patent Abstracts of Japan, vol. 15, No. 304 (E–1096) 5 Aug. 1991, JP–A–03 108 975 (Hitachi Ltd.) 9 May 1991.

Patent Abstracts of Japan vol. 14, No. 105 (E–895) 26 Feb. 1990, JP–A–01 305 689 (Hitachi Ltd) 8 Dec. 1989.

*Primary Examiner*—James J. Groody
*Assistant Examiner*—Chris Grant
*Attorney, Agent, or Firm*—William S. Frommer; Alvin Sinderbrand

[57] ABSTRACT

A digital recording/reproducing apparatus having an external input digital interface is disclosed. A changeover switch is controlled by a changeover control circuit for selecting horizontal synchronizing signals generated by horizontal synchronizing generator for an external input mode and for selecting horizontal synchronizing signals derived from reproduced video signals reproduced from a recording medium for a playback mode. Standard color sub-carrier signals may be generated by a color sub-carrier signal generator based on the horizontal synchronizing signals as selected by the changeover switch. Even when the digital video signals supplied from outside for the external mode include non-standard horizontal synchronizing signals, standard composite video signals may be generated by an encoder by employing the color sub-carrier signals from the color sub-carrier signal generator.

5 Claims, 6 Drawing Sheets

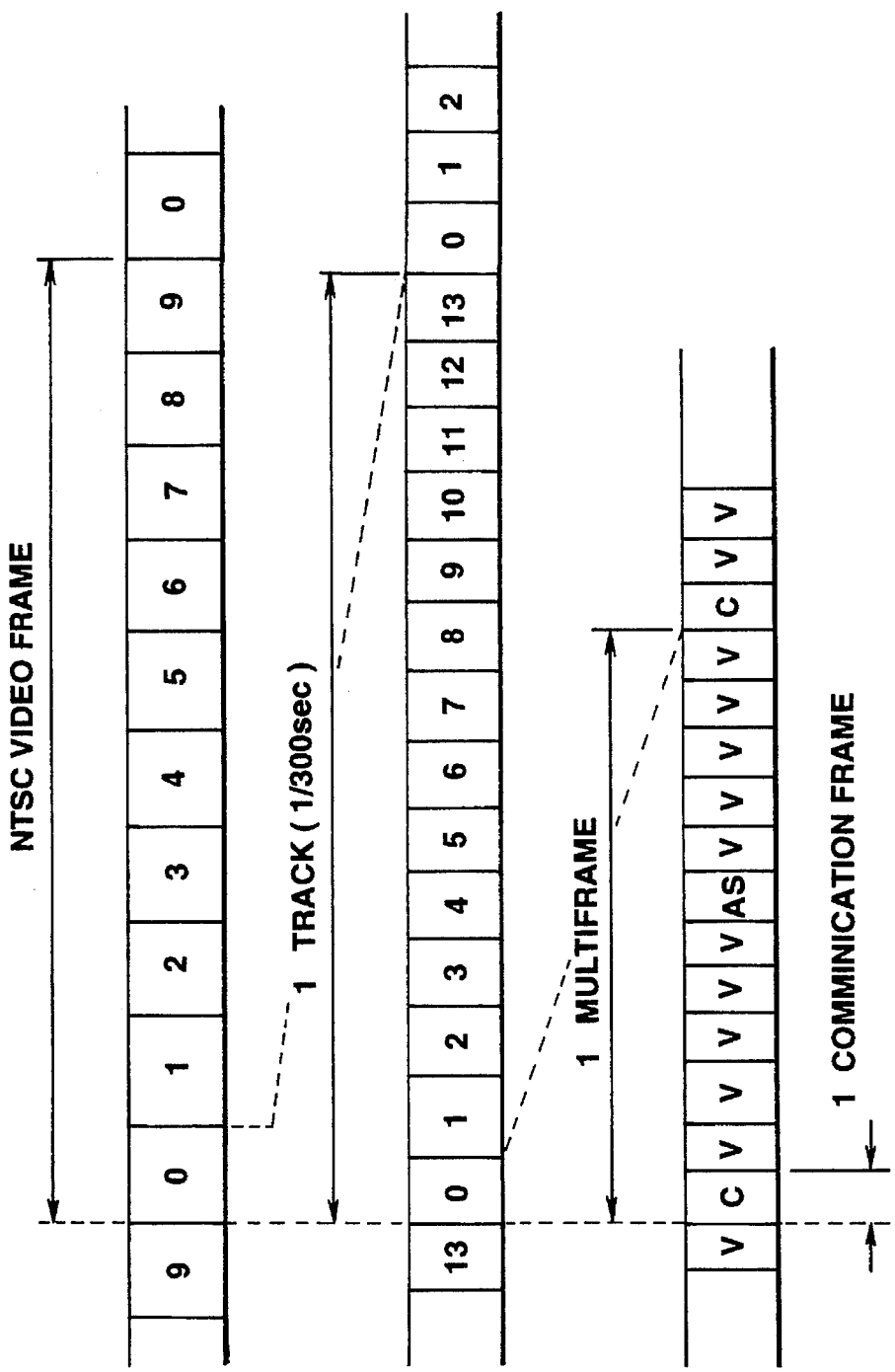

APPARATUS FOR GENERATING A COMPOSITE VIDEO SIGNAL

BACKGROUND OF THE INVENTION

1. Field of the Invention

This invention relates to a digital video tape recorder for recording and reproducing digital video signals.

2. Description of Related Art

With the progress in the digital recording system, a digital VTR (DVTR) capable of recording/reproducing pictures with a picture quality higher than that achievable with the analog VTR employing a low carrier wave FM recording system, is being put to practical application.

Although not shown, the constitution of the recording/reproducing system for the digital VTR is schematically explained hereinbelow.

In the recording system, input analog video signals are converted by an analog/digital (A/D) converter into digital signals which are segmented into blocks each being of a suitable size. The resulting block-based signals are compressed and encoded for error correction and error concealment on the block basis. In the reproducing system, synchronizing signals are appended on the block basis for frame synchronization and word synchronization. The resulting signals are processed with channel coding or translation into signals more amenable to high-density recording, and with data compression. In the recording equalization circuit, the resulting signals are processed with waveforming for correcting the non-linear distortion produced during the recording process. The recording current is supplied to a rotary head via a recording amplifier and a rotary transformer for recording the digital signals on the magnetic tape.

In the reproducing system, the signals read from the magnetic tape are amplified by a playback amplifier and equalized in waveform for producing a waveform with which it is easier to recognize digital signals. From the equalized signals, clocks are reproduced by a PLL circuit by way of clock reproduction for regenerating the recorded digital signals. The synchronizing signals are detected to clarify the points of signal segmentation and the reproduced signals are demodulated and corrected for time-base instability. The signals are corrected and concealed for errors and restored by a digital/analog converter into analog output signals.

If there is only one VTR, the input signals at the input terminal are recorded on a magnetic tape, or the pre-recorded signals are read from the magnetic tape so as to be outputted on a display unit, such as a television receiver. If there are two VTRs connected to each other, it becomes possible to record the signals entered at an input terminal of one of the VTRs or recorded signal on a magnetic tape loaded in the VTR on a magnetic tape loaded on the other VTR, with the signals thus recorded being outputted at an output terminal of the other VTR for being monitored on a display unit.

That is, the digital interfaces of the two VTRs are interconnected and analog signals from a television, a television game unit or an analog VTR are entered to one of the digital VTRs so as to be entered via the digital interfaces to the other digital VTR for recording on the magnetic tape loaded therein, while the signals are simultaneously monitored on a display unit connected to an analog signal output terminal of the other digital VTR. There may be occasions wherein the signals entered in the other digital VTR are the signals read by the firstly stated digital VTR from its magnetic tape.

The color television signals employed in a color television receiver in general, connected to the digital VTR, such as NTSC or PAL system color television signals, are composite color signals composed of luminance signals Y and two chrominance signals R-Y and B-Y, or I signals (broad-range signals) and Q (narrow-range signals) in the case of the NTSC system, multiplexed on the luminance signals by frequency interleaving, and are known as composite signals. On the other hand, Y, R-Y and B-Y or Y, I and Q signals and R, G and B color signals, known as component signals, may be obtained by separating the composite signals into the luminance signals and chrominance signals using a comb-filter by way of Y/C separation, or matrix transformation for R, G and B signals.

The NTSC signals may be generated by capturing the horizontal synchronization signals $f_H$ by a phase-locked oscillator (PLL) for synthesizing color sub-carrier signals $f_{SC}$ (3.58 MHz), two-phase quadrature modulating the color sub-carrier signals $f_{SC}$ with the I and Q chrominance signals and by frequency-multiplexing the modulated color sub-carrier signals with the luminance signals Y.

Meanwhile, when the analog video signals entered to one digital VTR or digital video signals reproduced from a magnetic tape of the digital VTR are entered via a digital interface to the other digital VTR, there are occasions wherein the vertical or horizontal synchronizing signals of the input signals are not the standard signals. Consequently, when the input digital video signals are translated into color television signals as output signals, chrominance signals other than standard signals are produced, because the color sub-carrier signals are then produced using the horizontal synchronizing signals which are not standard signals.

For example, output signals of television game sets or analog VTRs may also be entered to the one digital VTR besides the ordinary television signals. Although the usual analog television signals, that is the composite video signals, are outputted from the usual television system, output signals of the television game units or the speed-changed playback signals of the analog VTRs are component signals containing the vertical or horizontal synchronizing signals which are not standard signals contained in the analog television signals. Consequently, if the analog signals are entered via the digital interfaces to the other digital VTR for reproduction subsequently by a television receiver connected to its analog output signal terminal, various inconveniences, such as failure in color display in the displayed image, may be incurred because of the content of the chrominance signals which are not the standard signals.

OBJECT AND SUMMARY OF THE INVENTION

In view of the above-depicted status of the prior art, it is a principal object of the present invention to provide a digital VTR unit in which the horizontal synchronizing signals other than the standard signals, occasionally contained in the digital video signals entered from outside, may be outputted after conversion into the composite video signals which are the standard color television signals.

According to the present invention, there is provided a digital recording/reproducing apparatus having an external inputting digital interface comprising an encoder for generating composite video signals from digital video signals, a color sub-carrier signal generator for generating color sub-carrier signals to be supplied to the encoder, a horizontal synchronizing signal oscillator for generating standard horizontal synchronizing signals, a changeover switch for changing over horizontal synchronizing signals to be supplied to the color sub-carrier signal generator, and a changeover control circuit for controlling the changeover of the changeover switch. The changeover switch is controlled by the changeover control circuit for selecting the standard horizontal synchronizing signals generated by the horizontal synchronizing signal oscillator for an external input mode when the digital video signals are entered via the digital interface from outside. The changeover switch is also controlled by the changeover control circuit for selecting the horizontal synchronizing signals derived from playback video signals for a playback mode.

The changeover control circuit has decision means for deciding during the external input mode whether or not the horizontal synchronizing signals for the digital video signals are standard signals. The changeover switch is controlled for selecting the horizontal synchronizing signals for the digital video signals if the horizontal video signals for the digital video signals are standard signals. The changeover switch is also controlled for selecting standard horizontal synchronizing signals generated by the horizontal synchronizing signal oscillator if the horizontal video signals for the digital video signals are not standard signals.

It is possible with the digital VTR according to the present invention to translate input digital video signals containing horizontal synchronizing signal other than the standard signals into the composite video signals which are the standard color television signals.

BRIEF DESCRIPTION OF THE DRAWINGS

FIGS. 5A–5C show a format for frame-based digital signals.

DESCRIPTION OF THE PREFERRED EMBODIMENTS

Figure 1:
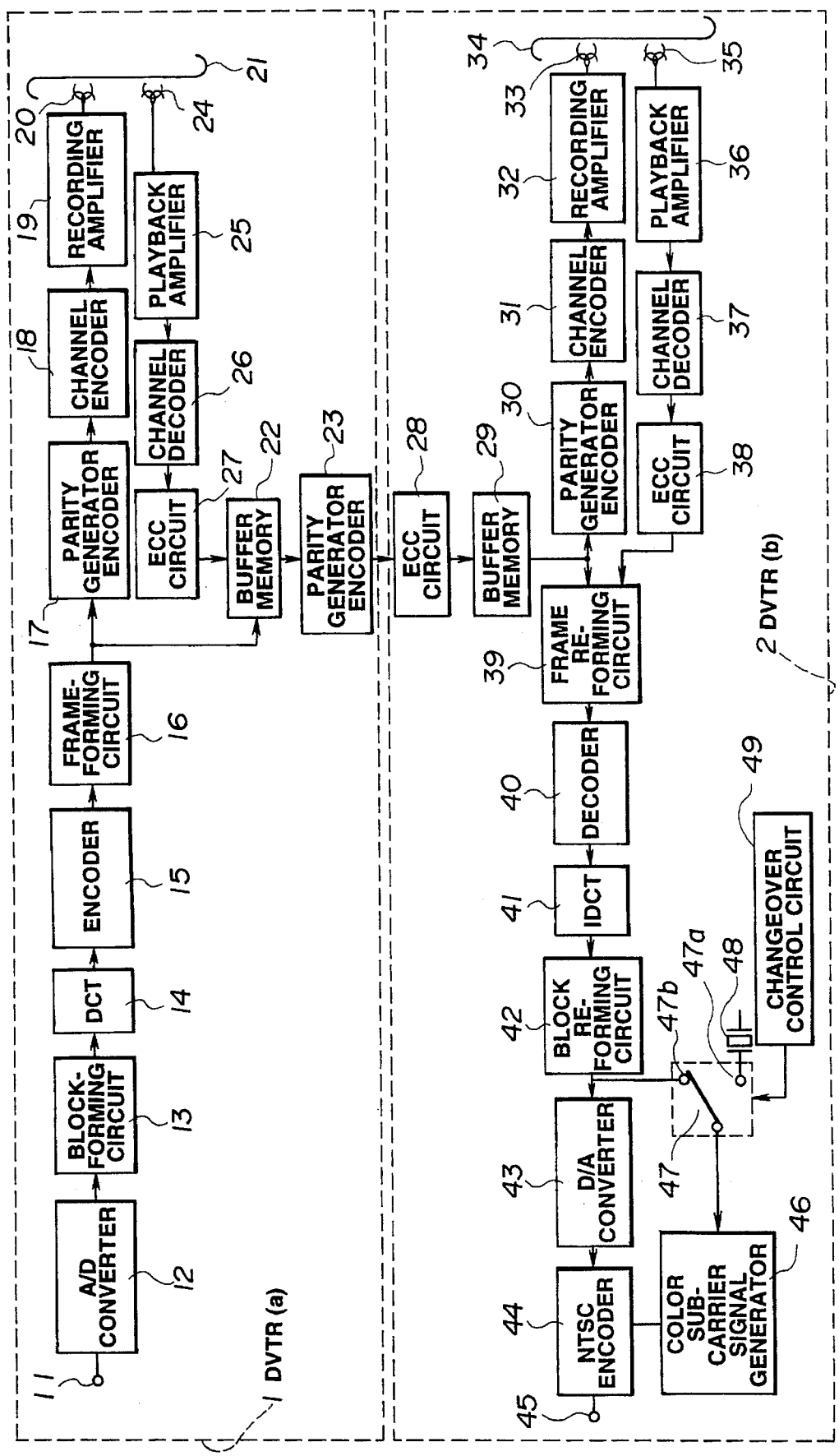
FIG. 1 is a block diagram showing a schematic arrangement of a first embodiment of the present invention of inputting digital video signals to digital VTRs according to the present invention.

Referring to the drawings, preferred embodiments of the present invention will be explained in detail.

FIG. 1 shows, in a schematic block diagram, a first embodiment of the present invention of inputting digital video signals to the digital VTR of the present invention for recording on a magnetic tape and reproducing and monitoring the recorded digital video signals.

The composite video signals, entered at an analog input signal terminal 11 of a digital VTR (a) 1, are converted by an analog/digital (A/D) converter 12 into digital video signals, which are segmented by a block-forming circuit 13 into blocks each being of a suitable size before being orthogonally transformed by a discrete cosine transform (DCT) unit 14 and variable length encoded by an encoder 15. The encoded signals are segmented into video frames by a frame-forming circuit 16.

Each video frame is completed by ten tracks, as shown at A in FIG. 5. Each track is made up of 14 multi-frames, as shown at B in FIG. 5. Each multi-frame is made up of 12 communication frames, with the data contents of each communication frame being control frames C for storing the auxiliary information of digital video signals, video data frames V, an audio data frame A or a sub-code S for storing auxiliary signals for video data or audio data, as shown at C in FIG. 5.

The encoded signals, segmented into frames by the frame-forming circuit 16, are encoded for error correction or concealment on the frame basis by a parity generating circuit 17 and processed by a channel encoder 18 with channel coding for being converted into signals more amenable to high-density recording. The signals are then recorded on a magnetic recording tape 21 by means of a recording amplifier 19 and a recording head 20.

Figures 6A, 6B:
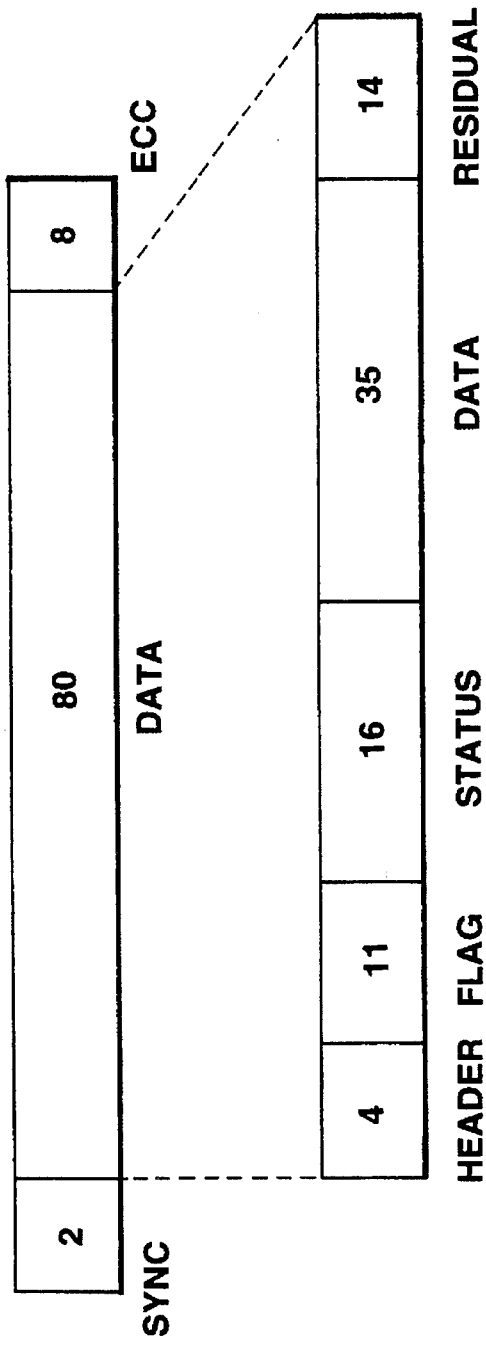
FIGS. 6A–6B show a format for a protocol frame and data contents of a control frame.

On the other hand, the signals segmented into frames by the frame-forming circuit 16 are transmitted via a buffer memory 22 to a parity generator 23, where there are added to each communication frame 2 SYNC bits for synchronization detection and 8 parity bits ECC, before and after 80 DATA bits as shown at A in FIG. 6, for correcting the errors produced at the signal outputting time, and the resulting data is transmitted via a digital interface to a digital VTR (b) 2.

The DATA bits in the control frame of the communication frame are made up of a 4-bit header for forming the communication mode and vertical synchronization signals, 11-bit flag data for storing the flag information for each block in each multi-frame, 16-bit status data for storing the status information such as VTR mode or time code information, 35-bit data for storing the information necessary for data communication and 14-bit residual data, as shown at B in FIG. 6. The header comprises the information concerning the track numbers of the control frame for the header within a given frame and the multi-frame numbers within a given track. Since the track transfer rate is set to 1/300 second, it becomes possible to calculate the horizontal synchronizing signal of the transmitted digital video signals from the position information and the transfer rate.

Other than the digital signals entered after conversion from analog signals into digital signals as described above, the digital signals entered from the reproducing system within the digital DTR (a) 1 may also be entered to the digital VTR (b) 2. As for the playback signals from the reproducing system of the digital VTR(a) 1, digital signals are read from the magnetic tape 21 via the playback head 24 so as to be processed via a playback amplifier 25 by a channel decoder 26 and corrected or concealed for errors by an ECC circuit 27 before being supplied via the buffer memory 22 to the parity generator 23. The signals are converted by the parity generator 23 into the above-mentioned communication digital video signals before being transmitted via a digital interface to the digital VTR (b) 2.

The signals supplied to the digital VTR (b) 2 are corrected for errors caused at the data input time by an ECC circuit 28 of the digital VTR (b) 2 and are transmitted via a buffer memory 29 to both the recording system and the reproducing system.

The digital signals transmitted to the recording system are corrected for errors by a parity generator 30 on the frame basis and converted by a channel encoder 31 before being recorded via a recording amplifier 32 and a recording head 33 on a magnetic tape 34.

The digital signals transmitted to the reproducing system are separated by a frame resolution (re-forming) circuit 39 into frames and demodulated by a decoder 40. The decoded signals are inverse discrete cosine transformed by an IDCT 41 and separated into blocks of compressed digital video signals by a block resolution circuit 42 for decompression and generation of vertical and horizontal synchronization signals.

A changeover switch 47 is changed over by a changeover control circuit 49 for changing over a signal to be entered to a color sub-carrier signal generator 46, During an external input mode when the input signal to the changeover switch 47 is an external signal, the changeover switch 47 is changed over by a changeover control circuit 49 to a fixed terminal 47a. This causes the horizontal synchronization signals generated by a horizontal synchronizing signal oscillator 48 to be supplied to the color sub-carrier signal generator 46. During a playback mode when the input signal to the changeover switch 47 is a playback signal by the digital VTR (b) 2, the changeover switch 47 is changed over by the changeover control circuit 49 to a fixed terminal 47b. This causes the horizontal synchronization signals for the playback signals to be supplied to the color sub-carrier signal generator 46.

Consequently, during the external input mode, the color sub-carrier signals generated by the color sub-carrier signal generator 46 are transmitted to an NTSC encoder 44, in which the color sub-carrier signals are modulated by two-phase quadrature modulation with the chrominance signals supplied from a D/A converter 43 and frequency-multiplexed with the luminance signals for synthesizing composite video signals. The composite video signals are outputted at an analog output signal terminal 45 so as to be monitored on a color television receiver or the like.

During the playback mode, as opposed to the external input mode for receiving external input signals, the digital signals read out from the magnetic tape 34 are converted via a playback amplifier 36 by a channel decoder 37 so as to be corrected and concealed for errors by an ECC circuit 38. The signal processing similar to that performed by the playback system for the external input mode is performed by the frame resolution circuit 39, decoder 40 and the IDCT 41. The processed signals are decompressed by the block resolution circuit 42 for decompression and vertical and horizontal synchronizing signals are also generated.

During the playback mode, the changeover circuit 47 is changed over by the changeover control circuit 49 to the fixed terminal 47b so that the horizontal synchronizing signals for the playback signals are supplied via the terminal 47b to the color sub-carrier signal generator 46. The color sub-carrier signal generator 46 transmits the color sub-carrier signals generated on the basis of the horizontal synchronizing signals for the playback signals to the NTSC encoder 44, in which the color sub-carrier signals are modulated by two-phase quadrature modulation with the chrominance signals supplied from the D/A converter 43 and are frequency-multiplexed with the luminance signals for synthesizing composite video signals. The composite video signals are outputted at the analog output signal terminal 45 so as to be monitored on a color television or the like.

Figure 2:
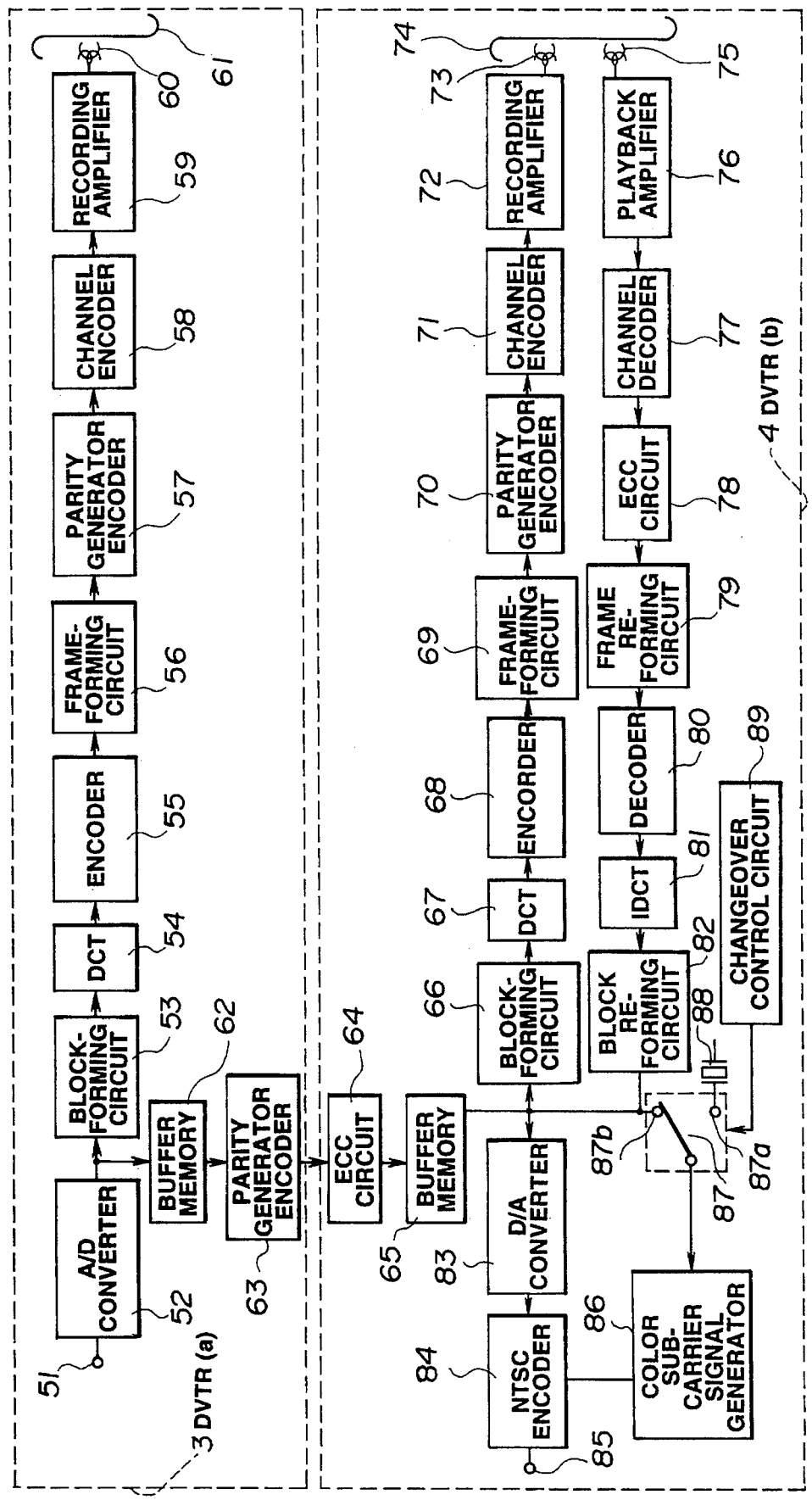
FIG. 2 is a block diagram showing a schematic arrangement of a second embodiment of the present invention of inputting digital video signals to digital VTRs according to the present invention.

FIG. 2 shows, in a schematic block diagram, a second embodiment of the present invention of inputting digital video signals to the digital VTR of the present invention for recording on a magnetic tape and reproducing and monitoring the recorded digital video signals.

The analog video signals entered at an analog input signal terminal 51 of a digital VTR (a) 3 are converted by an analog/digital (A/D) converter 52 into digital video signals. A block-forming circuit 53, a DCT 54, an encoder 55, a frame-forming circuit 56, a parity generator 57, a channel encoder 58, a recording amplifier 59, a recording head 60 and a magnetic tape 61 of the recording system within the digital VTR (a) 3 perform the signal processing operation similar to that performed by the block-forming circuit 13, DCT 14, encoder 15, frame-forming circuit 16, parity generator 17, channel encoder 18, recording amplifier 19, recording head 20 and the magnetic tape 21, so that detailed explanation is not made herein for simplicity.

The signals digitized by the A/D converter 52 are supplied via a buffer memory 62 to a parity generator 63. The digital signals are converted by the parity generator 63 into the above-mentioned communication digital video signals which are transmitted to a digital VTR (b) 4.

The signals transmitted to the digital VTR (b) 4 are corrected for errors caused at the data inputting time by an ECC circuit 64 of the digital VTR (b) 4 and are transmitted via a buffer memory 65 to both the recording system and the reproducing system.

The signals transmitted to the recording system are recorded on a recording tape 74 via a block-forming circuit 66, a DCT 67, an encoder 68, a frame-forming circuit 69, a parity generator 70, a channel encoder 71, a recording amplifier 72 and a recording head 73. The operation performed by these signal processing circuit components is similar to that performed by the block-forming circuit 13, DCT 14, encoder 15, frame-forming circuit 16, parity generator 17, channel encoder 18 and the recording amplifier 19 in the digital VTR (a) 1 shown in FIG. 1, so that detailed explanation is not made herein for simplicity.

Similarly to the changeover switch 47 of the digital VTR (b) 2 shown in FIG. 1, a changeover switch 87 is changed over by a changeover control circuit 89 for changing over an input signal to a color sub-carrier signal generator 86. During the external input mode, the changeover switch 87 is changed over by a changeover control circuit 89 to a fixed terminal 87a. This causes the horizontal synchronizing signals generated by a synchronizing signal oscillator 88 to be supplied to the color sub-carrier signal generator 86. During the playback mode by the digital VTR (b) 4, the changeover switch 87 is changed over by the changeover control circuit 89 to a fixed terminal 87b. This causes the horizontal synchronizing signals for the playback signals to be supplied to the color sub-carrier signal generator 86.

Consequently, during the external input mode, the color sub-carrier signals generated by the color sub-carrier signal generator 86 are transmitted to an NTSC encoder 84, based on the horizontal synchronizing signals. In the NTSC encoder, the color sub-carrier signals are modulated with the chrominance signals supplied from a D/A converter 83 by two-phase quadrature modulation and are frequency-multiplexed with the luminance signals for synthesizing composite video signals. The composite video signals are outputted at an analog output signal terminal 85 so as to be monitored on a color television or the like.

During the playback mode, as opposed to the external input mode for external input signals, the digital signals read by a magnetic tape 74 via a playback head 75 are processed by a playback amplifier 76, a channel decoder 77, an ECC circuit 78, a frame re-forming circuit 79, a decoder 80 and an IDCT 81. Since the operation performed by these signal processing circuit components is similar to that performed by the playback amplifier 36, channel decoder 37, ECC circuit 38, frame resolution (reforming) circuit 39, decoder 40 and the IDCT 41 within digital VTR (b) 2, detailed explanation is not given herein for simplicity. The signals processed in this manner are decompressed by the block re-forming circuit 82, at the same time that vertical and horizontal synchronizing signals are generated.

The changeover circuit 87 is changed over by the changeover control circuit 89 to the fixed terminal 87b so that the horizontal synchronizing signals for the playback signals are supplied via the terminal 87b to the color sub-carrier signal generator 86. The color sub-carrier signal generator 86 transmits the color sub-carrier signals generated on the basis of the horizontal synchronizing signals for the playback signals to the NTSC encoder 84, in which the color sub-carrier signals are modulated with the chrominance signals supplied from the D/A converter 83 by two-phase quadrature modulation and are frequency-multiplexed with the luminance signals for synthesizing composite video signals. The composite video signals are outputted at the analog output signal terminal 85 so as to be monitored on a color television or the like.

Figure 3:
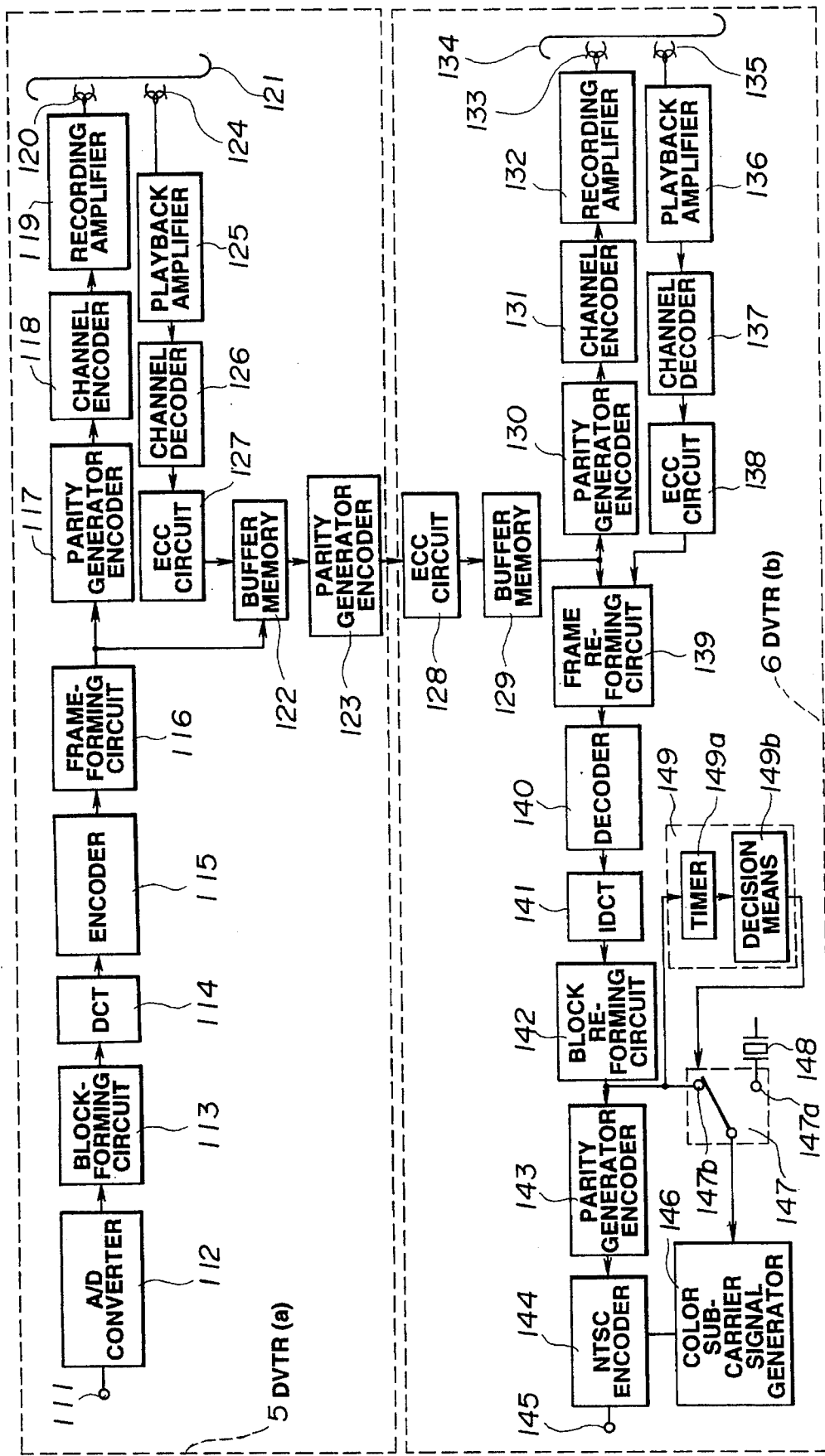
FIG. 3 is a block diagram showing a schematic arrangement of a third embodiment of the present invention of inputting digital video signals to digital VTRs according to the present invention.

FIG. 3 shows, in a schematic block diagram, a third embodiment of the present invention of inputting digital video signals to the digital VTR for recording on a magnetic tape and reproducing and monitoring the recorded digital video signals.

The analog video signals entered at an analog input signal terminal 111 of a digital VTR (a) 5 are converted by an analog/digital (A/D) converter 112 into digital video signals. A block-forming circuit, 113, a DCT 114 an encoder 115, a frame-forming circuit, 116, a parity generator 117, a channel encoder 118, a recording amplifier 119, a recording head 120 and a magnetic tape 121 of the recording system within the digital VTR (a) 5 perform the signal processing operation similar to that performed by the block-forming circuit, 13, DCT 14, encoder 15, frame-forming circuit 16, parity generator 17, channel encoder 18, recording amplifier 19, recording head 20 and the magnetic tape 21 within the digital VTR (a) 1, so that detailed explanation is not made herein for simplicity.

Other than the digital signals entered after conversion from analog signals into digital signals as described above, the digital signals entered from the reproducing system within the digital DTR (a) 5 may also be entered to the digital VTR (b) 6. When the digital signals are entered from the reproducing system of the digital VTR (a) 5, digital signals are read from the magnetic tape 121 via the playback head 124 so as to be processed by a playback amplifier 125, a channel decoder 126 and by an ECC circuit 127. The signal processing operations performed by the playback amplifier 125, channel decoder 126 and by the ECC circuit 127 are similar to those performed by the playback amplifier 25, a channel decoder 26 and by an ECC circuit 27 within the digital VTR (a) 1, so that detailed explanation is not given herein for simplicity.

The signals re-formed into frames by the frame-forming circuit 116 or the signals corrected for errors by the ECC circuit 127 are transmitted via a buffer memory 122 to a parity generator 123 where they are translated into the communication digital signals as described above so as to be transmitted via a digital interface to a digital VTR (b) 6.

The signals transmitted to the digital VTR (b) 6 are corrected for errors caused at the data input time by an ECC circuit 128 of the digital VTR (b) 6 and are transmitted via a buffer memory 129 to both the recording system and the reproducing system.

The signals transmitted to the recording system are recorded via a parity generator 130, a channel encoder 131, a recording amplifier 132 and a recording head 133 on a recording tape 134, Since the signal processing operations performed by these signal processing circuit components are similar to those of the parity generator 30, channel encoder 31 and the recording amplifier 32 as a recording system within the digital VTR (b) 2 shown in FIG. 1, detailed explanation is not given herein for simplicity.

The digital signals transmitted to the reproducing system of the digital VTR (b) 6 are processed by a frame re-forming circuit 139, a decoder 140 and an IDCT 141. Since the signal processing operations performed by the above signal processing circuit components are similar to those of the frame re-forming circuit 39, decoder 40 and the IDCT 41, detailed explanation is not given herein for simplicity. The signals thus processed are decompressed by a block re-forming circuit 142, at the same time as vertical and horizontal synchronizing signals are generated.

The changeover switch 147 is changed over by a changeover control circuit 149 for changing over the horizontal synchronizing signals to be entered to a color sub-carrier signal generator 146. During the external input mode, the changeover control circuit 149 detects the period of the horizontal synchronizing signals for the external input signals by a timer 149a and causes a decision unit 149b to decide whether or not the horizontal synchronizing signals are standard signals based on the detected period for controlling the changeover of the changeover switch 147. That is, if the horizontal synchronizing signals are not the standard signals, the changeover switch 147 is changed over to a fixed terminal 147a to permit the horizontal synchronizing signals generated by a horizontal synchronizing signal generator 148 to be supplied to the color sub-carrier signal generator 146. If the horizontal synchronizing signals are the standard signals, the changeover switch 147 is changed over to a fixed terminal 147b to permit the horizontal synchronizing signals for the external input signals to be supplied to the color sub-carrier signal generator 146. On the other hand, during the playback mode by the digital VTR (b) 6, the changeover switch 147 is changed over by the changeover control circuit 149 to the fixed terminal 147b so that the horizontal synchronizing signals for the playback signals are supplied to the color sub-carrier signal generator 146.

Consequently, during the external input mode, the period of the horizontal synchronizing signals of the digital video signals transmitted from the block re-forming circuit 142 are detected by the timer 149a. Based on the periods, the decision unit 149b decides whether or not the horizontal synchronizing signals are the standard signals. If the horizontal synchronizing signals are not the standard signals, the horizontal synchronizing signals generated by the horizontal synchronizing signal oscillator 148 are supplied via the fixed terminal 147a to the color sub-carrier signal generator 146. If the horizontal synchronizing signals are the standard signals, the horizontal synchronizing signals are supplied via the fixed terminal 147b to the color sub-carrier signal generator 146. Thus the color sub-carried signals are generated and supplied to the NTSC encoder 144.

In the NTSC encoder 144, the color sub-carrier signals are modulated by two-phase quadrature modulation with the chrominance signals supplied from the D/A converter 143 and are frequency-multiplexed with the luminance signals for synthesizing composite video signals. The composite video signals are outputted at the analog output signal terminal 145 so as to be monitored on a color television receiver or the like.

During the playback mode, as opposed to the external input mode for external input signals, the signals read by the magnetic tape 134 via a playback head 135 are processed by a playback amplifier 136, a channel decoder 137, an ECC circuit 138, a frame re-forming circuit 139, a decoder 140 and an IDCT 141. Since the operation performed by these signal processing circuit components is similar to that performed by the playback amplifier 36, channel decoder 37, ECC circuit 38, frame re-forming circuit 39, decoder 40 and the IDCT 41 within the digital VTR (b) 2 shown in FIG. 1, detailed explanation is not given herein for simplicity. The signals thus processed are decompressed by the block reforming circuit 142, at the same time as vertical and horizontal synchronizing signals are generated.

During the playback mode, the changeover circuit 147 is changed over by the changeover control circuit 149 to the fixed terminal 147b so that the horizontal synchronizing signals for the playback signals are supplied via the terminal 147b to the color sub-carrier signal generator 146. The color sub-carrier signal generator 146 transmits to the NTSC encoder 144 the color sub-carrier signals generated on the basis of the horizontal synchronizing signals for the playback signals. In the NTSC encoder 144, the color sub-carrier signals are modulated with the chrominance signals supplied from the D/A converter 143 by two-phase quadrature modulation and are frequency-multiplexed with the luminance signals for synthesizing composite video signals. The composite video signals are outputted at the analog output signal terminal 85 so as to be monitored on a color television or the like.

Figure 4:
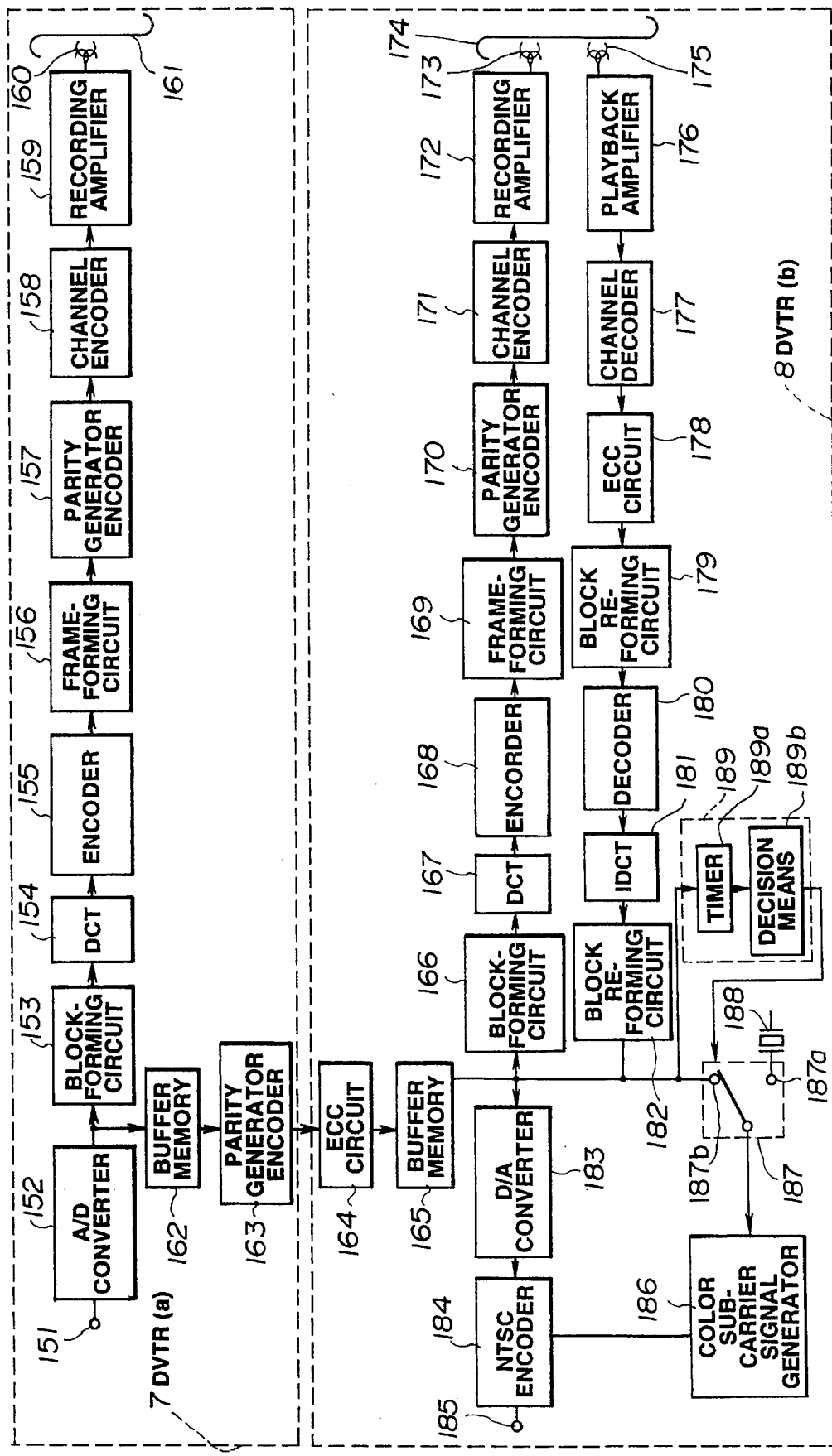
FIG. 4 is a block diagram showing a schematic arrangement of a fourth embodiment of the present invention of inputting digital video signals to digital VTRs according to the present invention.

FIG. 4 shows, in a schematic block diagram, a fourth embodiment of the present invention of inputting digital video signals to the digital VTR for recording on a magnetic tape and reproducing and monitoring the recorded digital video signals.

The analog video signals entered at an analog input signal terminal 151 of a digital VTR (a) 7 are converted by an analog/digital (A/D) converter 152 into digital video signals. A block-forming circuit 153, a DCT 154 an encoder 155, a frame-forming circuit 156, a parity generator 157, a channel encoder 158, a recording amplifier 159, a recording head 160 and a magnetic tape 161 of the recording system within the digital VTR (a) 7 perform the signal processing operation similar to that performed by the block-forming circuit 13, DCT 14, encoder 15, frame-forming circuit 16, parity generator 17, channel encoder 18, recording amplifier 19, recording head 20 and the magnetic tape 21 within the digital VTR (a) 1, so that detailed explanation is not made herein for simplicity.

The signals digitized by the analog/digital (A/D) converter 152 are supplied via a buffer memory 162 to a parity generator 163 where the digitized signals are translated into the digital video signals for communication which are transmitted to a digital VTR (b) 8.

The signals transmitted to the digital VTR (b) 8 are corrected for errors caused at the data input time by an ECC circuit 164 of the digital VTR (b) 8 and are transmitted via a buffer memory 165 to both the recording system and the reproducing system.

The signals transmitted to the recording system are recorded on a recording tape 174 via a block-forming circuit 166, a DCT 167, an encoder 168, a frame-forming circuit 169, a parity generator 170, a channel encoder 171, a recording amplifier 172 and a recording head 173. The operation performed by these signal processing circuit components is similar to that performed by the block-forming circuit 13, DCT 14, encoder 15, frame-forming circuit 16, parity generator 17, the channel encoder 18, recording amplifier 19 and the recording head 20 of the recording system in the digital VTR (a) 1 shown in FIG. 1, so that detailed explanation is not made herein for simplicity.

The changeover switch 187 is changed over by a changeover control circuit 189 for changing over the horizontal synchronizing signals to be entered to a color sub-carrier signal generator 186. During the external input mode, the changeover control circuit 189 detects the period of the horizontal synchronizing signals for the external input signals by a timer 189a and causes a decision unit 189b to decide whether or not the horizontal synchronizing signals are standard signals based on the detected period for controlling the changeover of the changeover switch 187. That is, if the horizontal synchronizing signals are not the standard signals, the changeover switch 187 is changed over to a fixed terminal 187a to permit the horizontal synchronizing signals generated by a horizontal synchronizing signal generator 188 to be supplied to the color sub-carrier signal generator 186. If the horizontal synchronizing signals are the standard signals, the changeover switch 187 is changed over to a fixed terminal 187b to permit the horizontal synchronizing signals for the external input signals to be supplied to the color sub-carrier signal generator 186. On the other hand, during the playback mode by the digital VTR (b) 8, the changeover switch 187 is changed over by the changeover control circuit 189 to the fixed terminal 187b so that the horizontal synchronizing signals for the playback signals are supplied to the color sub-carrier signal generator 186.

Consequently, during the external input mode, the period of the horizontal synchronizing signals of the digital video signals transmitted from the block re-forming circuit 182 are detected by the timer 189a. Based on the periods, the decision unit 189b decides whether or not the horizontal synchronizing signals are the standard signals. If the horizontal synchronizing signals are not the standard signals, the horizontal synchronizing signals generated by the horizontal synchronizing signal oscillator 188 are supplied via the fixed terminal 187a to the color sub-carrier signal generator 186. If the horizontal synchronizing signals are the standard signals, the horizontal synchronizing signals are supplied via the fixed terminal 187b to the color sub-carrier signal generator 186. Thus the color sub-carried signals are generated and supplied to the NTSC encoder 184.

In the NTSC encoder 184, the color sub-carrier signals are modulated by two-phase quadrature modulation with the chrominance signals supplied from the D/A converter 183 and are frequency-multiplexed with the luminance signals for synthesizing composite video signals. The composite video signals are outputted at the analog output signal terminal 185 so as to be monitored on a color television receiver or the like.

During the playback mode, as opposed to the external input mode for external input signals, the signals read by a magnetic tape 174 via a playback head 175 are processed by a playback amplifier 176, a channel decoder 177, an ECC circuit 178, a frame re-forming circuit 179, a decoder 180 and an IDCT 181. Since the operation performed by these signal processing circuit components is similar to that performed by the playback amplifier 36, channel decoder 37, ECC circuit 38, frame re-forming circuit 39, decoder 40 and the IDCT 41 within the digital VTR (b) 2 shown in FIG. 1, detailed explanation is not given herein for simplicity. The signals thus processed are decompressed by the block reforming circuit 182, at the same time as vertical and horizontal synchronizing signals are generated.

During the playback mode, the changeover circuit 187 is changed over by the changeover control circuit 189 to the fixed terminal 187b so that the horizontal synchronizing signals for the playback signals are supplied via the terminal 187b to the color sub-carrier signal generator 186. The color sub-carrier signal generator 186 transmits the color sub-carrier signals generated on the basis of the horizontal synchronizing signals for the playback signals to the NTSC encoder 184, in which the color sub-carrier signals are modulated with the chrominance signals supplied from the D/A converter 183 by two-phase quadrature modulation and are frequency-multiplexed with the luminance signals for synthesizing composite video signals. The composite video signals are outputted at the analog output signal terminal 185 so as to be monitored on a color television or the like.

In the above-described concrete embodiments, it is also possible to append to the digital video signals entered to the present digital VTRs the flags indicating whether or not the scanning frequency is of a normal value and, depending on the flag, change over the changeover switch by the changeover control circuit for inputting the horizontal synchronizing signals for digital video signals as external input signals or the horizontal synchronizing signals generated by the horizontal synchronizing signal oscillator to the color sub-carrier signal generator if the horizontal synchronizing signals for digital video signals as external input signals are the standard signals or if the horizontal synchronizing signals for digital video signals as external input signals are not the standard signals, respectively, for generating and outputting standard composite television signals.

The above-described embodiments are merely illustrative and a latitude of modifications may be undertaken within the scope of the present invention.

It is seen from above that, by changing over the changeover switch by a changeover control circuit for selecting the horizontal synchronizing signals generated by the horizontal synchronizing signal oscillator during the external input mode when digital video signal are entered, and for selecting the horizontal synchronizing signals for the playback digital video signals from the recording medium during the playback mode when the playback digital video signals from the recording medium are entered, the color sub-carrier signals as standard signals may be generated and hence the composite video signals as standard color television signals may be outputted at all times.

Besides, since the changeover control circuit is provided with decision means for detecting the period of the horizontal synchronizing signals of the digital video signals entered during the external input mode and for deciding, based on the detected period, whether or not the horizontal synchronizing signals are the standard signals, it is possible for the changeover decision circuit to changeover the changeover switch for causing the horizontal synchronizing signals to be entered to the color sub-carrier signal generator if such horizontal signals are standard signals and for causing the horizontal synchronizing signals generated by the horizontal synchronizing signal oscillator to be entered to the color sub-carrier signal generator. As a result thereof, it can be discerned more precisely whether or not the digital video signals entered during the external input mode are standard signals to render it possible to output more reliable normal composite video signals.

What is claimed is:

1. A digital recording/reproducing apparatus having an external inputting digital interface, said apparatus comprising:

an encoder for generating composite video signals from digital video signals, a color sub-carrier signal generator for generating color sub-carrier signals to be supplied to said encoder on the basis of horizontal synchronizing signals, a changeover switch for changing over the horizontal synchronizing signals to be supplied to said color sub-carrier signal generator, a horizontal synchronizing signal oscillator for generating standard horizontal synchronizing signals, and a changeover control circuit for controlling the changeover of said changeover switch, said changeover switch being controlled by said changeover control circuit for selecting the standard horizontal synchronizing signals generated by said horizontal synchronizing signal oscillator for an external input mode when the digital video signals are entered from outside via said digital interface, said changeover switch being also controlled by said changeover control circuit for selecting horizontal synchronizing signals derived from playback video signals obtained during a playback mode.

2. The digital recording/reproducing apparatus as in claim 1, wherein said changeover control circuit includes decision means for deciding during the external input mode whether or not the horizontal synchronizing signals for said digital video signals are standard signals, said changeover switch being controlled for selecting said horizontal synchronizing signals if said horizontal synchronizing signals for said digital video signals are standard signals, said changeover switch also being controlled for selecting the standard horizontal synchronizing signals generated by said horizontal synchronizing signal oscillator if said horizontal synchronizing signals are not standard signals.

3. The digital recording/reproducing apparatus as in claim 1 further comprising means for generating the horizontal synchronizing signals for said video signals based on position information of a communication frame for a video frame of the digital video signals entered via said digital interface.

4. The digital recording/reproducing apparatus as in claim 1, wherein said control means includes means, operable during said external input mode, for deciding whether horizontal synchronizing signals obtained from the digital video signals received through said digital interface are standard signals, and wherein said switch means is controlled by said control means so as to select said horizontal synchronizing signals obtained from the digital video signals received through said digital interface if said horizontal synchronizing signals obtained from the digital video signals received through said digital interface are said standard signals and to select said standard horizontal synchronizing signals from said horizontal synchronizing signal oscillator means if said horizontal synchronizing signals obtained from the digital video signals received through said digital interface are not said standard signals.

5. A digital recording/reproducing apparatus having a digital interface and being adapted to operate in a playback mode and an external input mode in which externally generated digital video signals are received through said digital interface by said apparatus, said apparatus comprising:

horizontal synchronizing signal oscillator means for generating standard horizontal synchronizing signals;

means for generating horizontal synchronizing signals from playback video signals produced during said playback mode;

switch means for selecting one of said standard horizontal synchronizing signals and said horizontal synchronizing signals generated from said playback video signals;

control means for controlling said switch means such that said switch means selects said standard horizontal synchronizing signals when said apparatus is operating in said external input mode and selects said horizontal synchronizing signals generated from said playback video signals when said apparatus is operating in said playback mode;

color sub-carrier signal generator means for generating color sub-carrier signals and for supplying the same therefrom on the basis of the selected one of said standard horizontal synchronizing signals and said horizontal synchronizing signals generated from said playback video signals from said switch means; and encoder means receiving the digital video signals received through said digital interface when said apparatus is operating in said external input mode and said playback video signals when said apparatus is operating in said playback mode and further receiving said color sub-carrier signals from said color sub-carrier signal generator means for generating composite video signals therefrom.

* * * * *